Sept. 12, 1939. H. W. WYLIE 2,172,926
WHEEL TYPE PALLET CONVEYER
Filed March 7, 1938 2 Sheets-Sheet 1
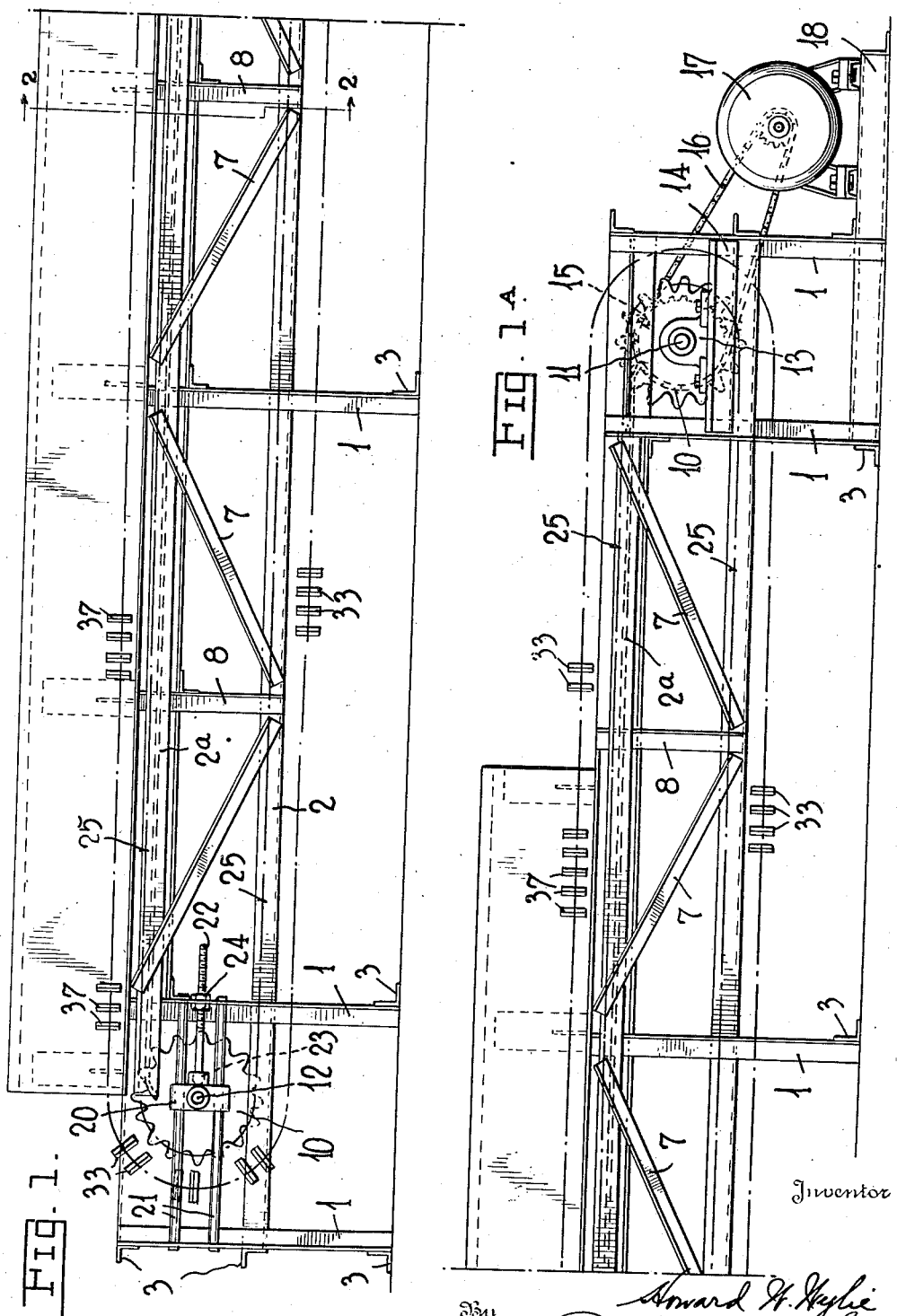

Sept. 12, 1939.     H. W. WYLIE     2,172,926
WHEEL TYPE PALLET CONVEYER
Filed March 7, 1938     2 Sheets-Sheet 2
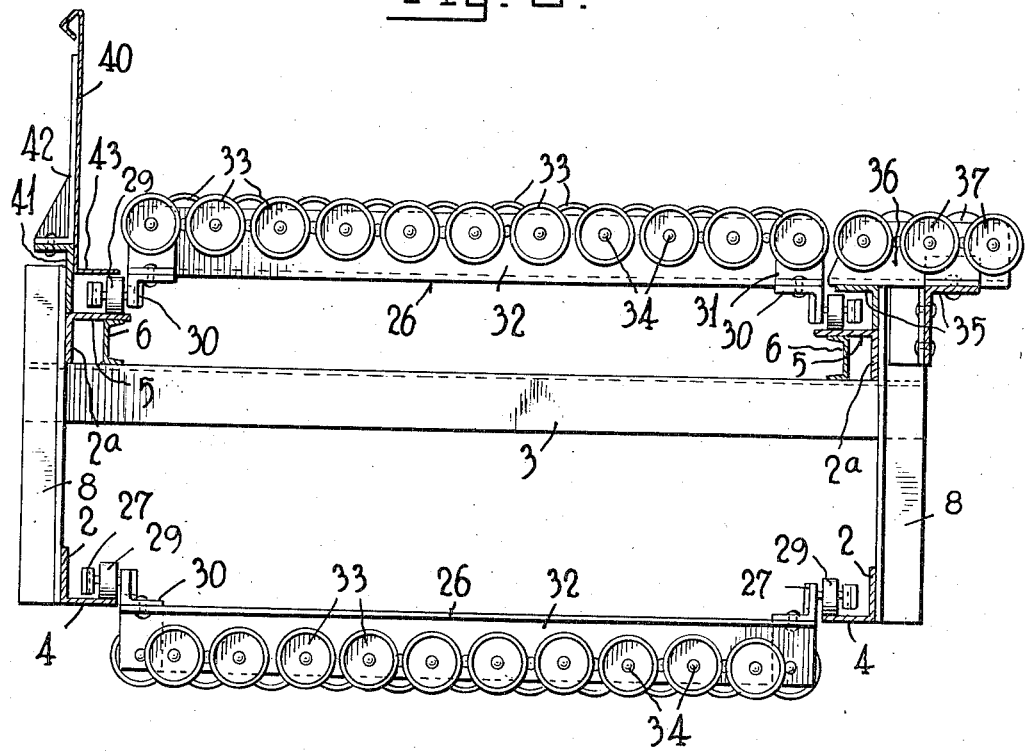
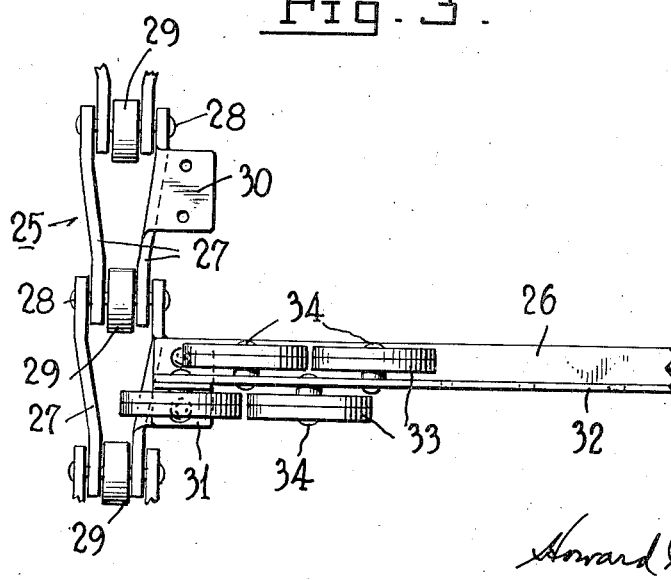
Inventor
Howard W. Wylie
By Arthur M. Hahn
Attorney Patented Sept. 12, 1939

2,172,926

UNITED STATES PATENT OFFICE 2,172,926

WHEEL TYPE PALLET CONVEYER

Howard W. Wylie, Seattle, Wash., assignor to Mathews Conveyer Company, Ellwood City, Pa., a corporation of Pennsylvania Application March 7, 1938, Serial No. 194,487

8 Claims. (Cl. 198—183)

This invention relates to conveyers and is directed more particularly to power driven conveyers adapted for the reception and discharge of articles at substantially right angles to the direction of travel of the conveyer.

The present invention is designed primarily for use with the structure illustrated in my copending application for Elevators, Serial No. 191,773, filed February 21, 1938, although it will be understood that it is not limited to such use and it may be used in connection with other types of apparatus, or alone where it is desired to convey articles in this particular manner.

The primary object of the present invention is to provide an endless power driven conveyer having the upper run thereof in the form of a substantially flat and horizontally disposed antifriction surface which is adapted to receive and discharge the articles at substantially right angles to the direction of travel of the conveyer.

Another object is to provide a novel form of endless conveyer wherein the endless travelling belt shall be composed of a multiplicity of antifriction devices closely grouped to define a substantially continuous supporting surface for the articles being conveyed.

A further object is to provide a conveyer having an endless travelling belt of the aforesaid character which shall be particularly flexible and capable of passing around a relatively small radius at each end of travel, thereby providing a relatively compact form of endless conveyer that may be readily adapted to existing conveyer systems or units.

A still further object is to provide a conveyer of the aforesaid character which shall consist of few parts that are relatively simple in construction, inexpensive to manufacture, and easy to assemble.

With the foregoing and other objects and advantages in view, the invention may be stated to consist in the various novel features of construction and arrangement or combination, all of which will be fully described hereinafter and pointed out in the appended claims.

In the drawings accompanying and forming a part of this application.

Figures 1 and 1a are a side elevation of a conveyer constructed in accordance with my invention;

Figure 2 is a vertical sectional view taken on the line 2—2 of Figure 1; and

Figure 3 is an enlarged fragmentary top plan view of a portion of the conveyer belt.

The framework support for the conveyer is conveniently formed of angle iron and comprises a plurality of vertically disposed ground engaging members 1, to which are secured, as by welding, a plurality of longitudinal members 2, 2a and transverse members 3. As shown in Figure 2, the lower longitudinal members 2 are preferably arranged with the open angle portions facing each other and opening upwardly whereby the laterally projecting flanges 4 extend inwardly and form a lower track for the conveyer belt, to be referred to hereinafter. The upper longitudinal members 2a are also arranged with the open angle portions facing each other but opening downwardly whereby the laterally projecting flanges 5 extend inwardly and form an upper track for the conveyer belt. Inasmuch as the upper run of the conveyer belt supports the load to be conveyed, I preferably reinforce the flanges 5 by placing channel members 6 thereunder. Each of these channel members rests on the transverse angle members 3 and is fastened in position by welding to the flanges 5 and members 3.

The main supporting framework is also braced by diagonal members 7 and short intermediate vertically disposed members 8 as clearly shown in Figures 1 and 1a.

Each of the upper longitudinal members 2a and the supporting channels 6 terminate short of the end of the main framework to permit the conveyer belt to pass around suitable rotary members, as shown in Figures 1 and 1a. These rotary members are illustrated as each consisting of a pair of sprocket wheels 10 arranged in spaced transverse positions on axles 11 and 12 respectively. Axle 11 is journalled in bearing blocks 13 that are mounted on horizontal angle bars 14 of the framework, and this axle is also fitted with a sprocket wheel 15 (Figure 1a) which is connected by means of a chain 16 to a prime mover such as the electric motor 17. The motor 17 is mounted on a sub-base framework 18 which forms part of the main framework.

The other axle 12 is journalled in bearing blocks 20, each of which is slidably mounted on a pair of rods 21. Each bearing block is provided with a threaded stem 22 which is connected at one end to the block by a ball and socket connection 23, and the opposite end of the stem extends through an aperture in the flange of one of the frame uprights 1. Nuts 24 are threaded on the stem 22, one on each side of the aforementioned flange. It is thus obvious that by adjusting the nuts 24, the bearing blocks 20, axle 12 and sprockets 10 may be moved longitudinally of the framework to adjust the tension of the belt conveyer.

The belt conveyer comprises a pair of laterally spaced endless chains 25 and interconnecting angle members 26. As shown in Figure 3, each chain is composed of a plurality of links 27 pivotally connected together at 28 and including a roller 29 journalled on each pivot pin. The inside bar of each link is formed with a shelf 30 to which the angle members 26 are connected. A short angle clip 31 also carried by the shelf acts as a strengthening brace for the angle members. Secured to the upstanding flange 32 of each angle member 26 are a plurality of antifriction wheels 33, each of which is carried by a stub shaft 34 projecting at substantially right angles to said flange. As shown in Figure 3, the wheels 33 are preferably arranged in alternate staggered relation on both sides of the flange 32 so that the bed of the conveyer belt is formed by a multiplicity of these wheels arranged in compact relation and providing a plurality of supporting surfaces for the articles on the conveyer.

In order to facilitate the movement of articles onto the conveyer from one side thereof and at substantially right angles to the direction of travel of the belt, I provide a relatively narrow and elongated antifriction wheel feed section as illustrated in Figure 2. This section comprises longitudinally extending angle members 35 fastened to the framework and short angle members 36 arranged transversely thereof. A plurality of wheels 37 similar to wheels 33 are mounted on the upwardly projecting flanges of the transverse angle members 36, and these wheels are also preferably arranged in compact alternate staggered relation. It will be noted that this wheel feed section serves as an anti-friction support for the articles while passing over the side of the main framework and onto the main conveyer belt.

When articles are fed onto the conveyer belt at right angles to its direction of travel, it will be obvious that such articles will move freely by reason of the antifriction wheels 37 and 33. In order to avoid the possibility of the articles moving transversely of the belt too great a distance, I preferably provide an upstanding stop wall 40. As shown in Figure 2, this wall is fastened to the framework by welding a longitudinally disposed angle member 41 to the top of angle member 5 and also to the uprights 1 and 8. Mounted on top of the lateral flange of the angle member 41 are a plurality of brackets 42 which serve to stiffen the sheet metal wall 40. It will be noted that I preferably deflect the lower end portion 43 of the wall inwardly to cover the chain 26, which not only protects the chain, but also confines the lubricant for the chain and prevents contact thereof with the articles on the conveyer. In a similar manner one of the angles 35 protects the other chain and confines the lubricant thereon.

In use, articles are received on the conveyer belt from a direction at right angles to the longitudinal axis of the belt. By reason of the multiplicity of antifriction wheels forming the surface of the belt, the articles move freely transversely thereof. After the articles are positioned on the belt, the electric motor 17 is started and the belt with the articles thereon moves in a path longitudinally of the framework. At a predetermined position, the motor is stopped and the articles may then be discharged at right angles to the belt on either side thereof. The electric motor 17 is preferably controlled by a push button circuit which forms no part of the present invention. If desired, under some circumstances, the conveyer belt may rotate continuously and the articles may be received and discharged during such motion of the belt, although primarily it is intended to operate the belt periodically as described above.

It is thus obvious that when the above described conveyer is used in connection with other conveying units, it will provide for a movement of the articles at substantially right angles to the normal direction of travel thereof.

What I claim is:

1. In a conveyer of the character described, an endless belt including laterally spaced flexible elements and transversely disposed members interconnecting said flexible elements, and a plurality of anti-friction devices carried by said transversely disposed members and forming the article supporting surface thereof, said anti-friction devices permitting free movement of the article only in directions at substantially right angles to the direction of travel of said belt.

2. In a conveyer of the character described, an endless belt including laterally spaced flexible elements and transversely disposed members interconnecting said flexible elements, and a plurality of closely spaced anti-friction wheels carried by said transversely disposed members and forming the article supporting surface thereof, said anti-friction wheels being rotatable in planes at an angle to the direction of travel of said belt.

3. In a conveyer of the character described, an endless belt comprising laterally spaced flexible elements and transversely disposed members interconnecting said flexible elements, and a plurality of anti-friction devices mounted on said members and forming the article supporting surface of said belt, said anti-friction devices being rotatable in planes at an angle to the direction of travel of said belt.

4. In a conveyer of the character described, an endless belt comprising laterally spaced flexible elements and transversely disposed members interconnecting said flexible elements, and a plurality of anti-friction wheels mounted on said members for rotation in planes at an angle to the direction of travel of said belt.

5. In a conveyer of the character described, an endless belt comprising laterally spaced flexible elements and transversely disposed rigid members interconnecting said flexible elements, and a plurality of anti-friction wheels mounted on each of said rigid members in staggered and closely adjacent relation, said wheels being rotatable in planes at an angle to the direction of travel of said belt.

6. In a conveyer of the character described, an endless belt comprising laterally spaced endless chains and interconnecting transversely disposed rigid members having upstanding flanges, and a plurality of anti-friction wheels rotatably mounted on opposite sides of said flanges in staggered and closely adjacent positions, said wheels being rotatable in planes at substantially right angles to the direction of travel of said belt.

7. In a conveyer of the character described, an endless belt comprising laterally spaced endless chains and transversely disposed angle members interconnecting said chains, said angle members each being arranged with a flange projecting substantially at right angles to the plane of the belt, each of said flanges being provided with a plurality of stub shafts arranged on opposite sides of said flange and in alternate staggered relation, and a wheel journalled on each of said shafts.

8. In a conveyer of the character described, a supporting framework, and an endless conveyer belt journalled in said framework, said belt comprising a pair of laterally spaced endless chains having rollers engaged with said framework to support and guide the belt in its movement, transversely disposed angle members interconnecting said chains, said angle members each being arranged with a flange projecting substantially at right angles to the plane of the belt, each of said flanges being provided with a plurality of stub shafts arranged on opposite sides of said flange in alternate staggered and closely adjacent relation, and a wheel journalled on each of said shafts, the peripheries of said wheels forming the article supporting surface of said conveyer belt.

HOWARD W. WYLIE.